US009252955B2

(12) United States Patent
Chamberlin et al.

(10) Patent No.: US 9,252,955 B2
(45) Date of Patent: Feb. 2, 2016

(54) APPARATUS AND METHODS FOR THE SECURE TRANSFER OF ELECTRONIC DATA

(75) Inventors: Charles R. Chamberlin, Arlington, VA (US); Bradley A. Reck, Sterling, VA (US)

(73) Assignee: United States Postal Service, Washington, DC (US)

(*) Notice: Subject to any disclaimer, the term of this patent is extended or adjusted under 35 U.S.C. 154(b) by 821 days.

(21) Appl. No.: 10/344,720

(22) PCT Filed: Aug. 20, 2001

(86) PCT No.: PCT/US01/25934
§ 371 (c)(1),
(2), (4) Date: Feb. 14, 2003

(87) PCT Pub. No.: WO02/17553
PCT Pub. Date: Feb. 28, 2002

(65) Prior Publication Data
US 2003/0177357 A1 Sep. 18, 2003

Related U.S. Application Data

(60) Provisional application No. 60/226,082, filed on Aug. 18, 2000.

(51) Int. Cl.
*H04L 29/06* (2006.01)
*H04L 9/32* (2006.01)

(52) U.S. Cl.
CPC .............. *H04L 9/321* (2013.01); *H04L 9/3247* (2013.01); *H04L 63/123* (2013.01); *H04L 63/0428* (2013.01); *H04L 2463/121* (2013.01)

(58) Field of Classification Search
USPC .............. 705/59, 60; 713/153, 155, 156, 168, 713/169, 170
See application file for complete search history.

(56) References Cited

U.S. PATENT DOCUMENTS

| 4,837,701 A | 6/1989 | Sansone et al. |
| 4,874,936 A | 10/1989 | Chandler et al. |

(Continued)

FOREIGN PATENT DOCUMENTS

| GB | 2174039 | 10/1986 |
| GB | 2271452 | 4/1994 |
| WO | WO 02/17553 | 2/2002 |
| WO | WO 03/015012 | 2/2003 |
| WO | WO 2004/023711 | 3/2004 |
| WO | WO 2004/059483 | 7/2004 |

OTHER PUBLICATIONS

Booth, K. S. 1981. Authentication of signatures using public key encryption. Commun. ACM 24, 11 (Nov. 1981), 772-774.*

(Continued)

*Primary Examiner* — Jeffery Williams
(74) *Attorney, Agent, or Firm* — Lewis Roca Rothgerber LLP

(57) ABSTRACT

An embodiment of the invention provides a method for processing a secure electronic transaction over a network from a sender to a receiver, which includes the process of generating a first unique representation of information included in the transaction, encrypting the information with a first encryption layer, and forming an encryption packet which includes the first encryption layer. The encryption packet is then transmitted over a network and then received the by a receiver. The authenticity of the encryption packet is verified and a receipt is generated using the information included in the encryption packet. The receipt is then transmitted to an electronic postmark server which verifies authenticity of the receipt. A postmarked receipt is then created by the electronic postmark server and a copy is sent to the sender an/or the receiver.

17 Claims, 13 Drawing Sheets

(56) References Cited

U.S. PATENT DOCUMENTS

| | | | |
|---|---|---|---|
| 5,031,223 A | 7/1991 | Rosenbaum et al. | |
| 5,204,966 A | 4/1993 | Wittenberg et al. | |
| 5,301,116 A | 4/1994 | Grunig | |
| 5,303,296 A | 4/1994 | Zucker | |
| 5,390,251 A | 2/1995 | Pastor et al. | |
| 5,454,038 A | 9/1995 | Cordery et al. | |
| 5,491,752 A | 2/1996 | Kaufman et al. | |
| 5,509,071 A * | 4/1996 | Petrie et al. | 705/53 |
| 5,513,264 A | 4/1996 | Wang et al. | |
| 5,612,889 A | 3/1997 | Pintsov et al. | |
| 5,734,337 A | 3/1998 | Kupersmit | |
| 5,734,568 A | 3/1998 | Borgendale et al. | |
| 5,742,807 A | 4/1998 | Masinter | |
| 5,754,671 A | 5/1998 | Higgins et al. | |
| 5,754,938 A * | 5/1998 | Herz et al. | 725/116 |
| 5,781,438 A | 7/1998 | Lee et al. | |
| 5,825,881 A | 10/1998 | Colvin, Sr. | |
| 5,903,651 A | 5/1999 | Kocher | |
| 5,925,864 A | 7/1999 | Sansone et al. | |
| 5,933,604 A | 8/1999 | Inakoshi | |
| 5,959,283 A | 9/1999 | Tawara et al. | |
| 5,966,542 A | 10/1999 | Tock | |
| 5,974,148 A * | 10/1999 | Stambler | 705/75 |
| 5,999,967 A * | 12/1999 | Sundsted | 709/206 |
| 6,006,200 A | 12/1999 | Boies et al. | |
| 6,021,202 A * | 2/2000 | Anderson et al. | 705/54 |
| 6,041,317 A | 3/2000 | Brookner | |
| 6,044,462 A | 3/2000 | Zubeldia et al. | |
| 6,073,104 A | 6/2000 | Field | |
| 6,088,482 A | 7/2000 | He et al. | |
| 6,088,805 A * | 7/2000 | Davis et al. | 726/10 |
| 6,141,441 A | 10/2000 | Cass et al. | |
| 6,170,058 B1 * | 1/2001 | Kausik | 713/193 |
| 6,182,219 B1 | 1/2001 | Feldbau et al. | |
| 6,219,652 B1 * | 4/2001 | Carter et al. | 705/59 |
| 6,219,669 B1 | 4/2001 | Haff et al. | |
| 6,243,466 B1 * | 6/2001 | Young et al. | 380/28 |
| 6,244,763 B1 | 6/2001 | Miller | |
| 6,289,334 B1 | 9/2001 | Reiner et al. | |
| 6,308,247 B1 | 10/2001 | Ackerman et al. | |
| 6,314,454 B1 * | 11/2001 | Wang et al. | 709/206 |
| 6,347,376 B1 | 2/2002 | Attwood et al. | |
| 6,428,219 B1 | 8/2002 | Stier et al. | |
| 6,457,012 B1 | 9/2002 | Jatkowski | |
| 6,461,063 B1 | 10/2002 | Miller et al. | |
| 6,463,354 B1 | 10/2002 | Pintsov | |
| 6,516,320 B1 | 2/2003 | Odom et al. | |
| 6,532,452 B1 * | 3/2003 | Pintsov et al. | 705/401 |
| 6,539,098 B1 | 3/2003 | Baker et al. | |
| 6,571,334 B1 | 5/2003 | Feldbau et al. | |
| 6,665,422 B1 | 12/2003 | Keil et al. | |
| 6,754,785 B2 | 6/2004 | Chow et al. | |
| 6,763,344 B1 | 7/2004 | Osentoski et al. | |
| 6,959,292 B1 * | 10/2005 | Pintsov | 705/62 |
| 6,985,888 B1 * | 1/2006 | Cordery et al. | 705/60 |
| 6,986,037 B1 * | 1/2006 | Assmann | 713/155 |
| 7,142,676 B1 * | 11/2006 | Hillier et al. | 380/278 |
| 7,240,199 B2 | 7/2007 | Tomkow | |
| 7,367,058 B2 | 4/2008 | Lawson | |
| 7,711,950 B2 | 5/2010 | Orbke et al. | |
| 7,797,543 B1 | 9/2010 | Campbell et al. | |
| 8,073,782 B2 | 12/2011 | Dillard et al. | |
| 2001/0011350 A1 * | 8/2001 | Zabetian | 713/176 |
| 2001/0044783 A1 | 11/2001 | Weisberg et al. | |
| 2002/0049670 A1 | 4/2002 | Moritsu et al. | |
| 2002/0083022 A1 | 6/2002 | Algazi | |
| 2002/0110397 A1 | 8/2002 | Bussell | |
| 2002/0127040 A1 | 9/2002 | Davies et al. | |
| 2003/0028783 A1 | 2/2003 | Collins et al. | |
| 2003/0046533 A1 * | 3/2003 | Olkin et al. | 713/152 |
| 2003/0074325 A1 * | 4/2003 | Ryan, Jr. | 705/60 |
| 2003/0088426 A1 | 5/2003 | Benson et al. | |
| 2003/0101143 A1 | 5/2003 | Montgomery et al. | |
| 2003/0177021 A1 | 9/2003 | Dutta | |
| 2004/0065598 A1 | 4/2004 | Ross et al. | |
| 2004/0093314 A1 | 5/2004 | MacKlin | |
| 2004/0111443 A1 | 6/2004 | Wong et al. | |
| 2004/0128274 A1 | 7/2004 | Snapp et al. | |
| 2004/0210763 A1 | 10/2004 | Jonas | |
| 2005/0060556 A1 | 3/2005 | Jonas | |
| 2005/0066182 A1 | 3/2005 | Jonas et al. | |
| 2005/0193075 A1 * | 9/2005 | Haff et al. | 709/206 |
| 2005/0209976 A1 | 9/2005 | Bailey et al. | |

OTHER PUBLICATIONS

R. H. Deng, L. Gong, A. A. Lazar, and W. Wang. Practical protocols for certified electronic mail. Journal of Network and Systems Management, 1996, pp. 1-21.*

Coffey, T. and Saidha, P. 1996. Non-repudiation with mandatory proof of receipt. Sigcomm Comput. Commun. Rev. 26, 1 (Jan. 1996), 6-17.*

Al-Hammadi, B.; Shahsavari, M., "Certified exchange of electronic mail (CEEM)," Southeastcon '99. Proceedings. IEEE, vol., no., pp. 40-43, 1999.*

Herda; "Non-Repudiation: Constituting Evidence and Proof in Digital Cooperation"; Computer Standards & Interfaces, vol. 17, No. 1, pp. 69-79 (1995).

International Preliminary Examination Report in PCT/US01/25934, mailed Apr. 30, 2003, 6 pages.

The GNU Privacy Handbook, 1999, http://www.gnupg.org/gph/en/manual.htm, website printout dated Apr. 11, 2001, 34 pages.

VeriSign OnSite Introduction Manual, VeriSign, Inc. DOC-GVS-PRD-INT-0001/Rev. 3, 2000, 66 pages.

Menezes, Alfred J., Chapter 11 of the Handbook of Applied Cryptography, CRC Press, 1996.

Author: United States Postal Service, "Performance Criteria for Information-Based Indicia and Security Architecture for Open lbl Postage Metering Systems," 1/12/99.

Automatic Data Capture, EDIFICE Bar Code Group, Apr. 2000.

"Cryptographic Module Security Policy for the Ascom Hasler Mailing Systems, Inc.;" Ascom Hasler Mailing Systems, Jun. 20, 2001, pp. 3-9.

Harn, L., "Two Internet B2C Services: e-Stamp and e-Ticket, Proc. of the 11th National Conference on Information Security," May 3, 2001, pp. 271-280, Tainan, Taiwan.

PCT Application No. PCT/US01/26125, International Search Report mailed Mar. 26, 2002.

PCT Application No. PCT/US02/17362, International Search Report mailed Jan. 16, 2003.

PCT Application No. PCT/US03/18412, International Search Report mailed Oct. 17, 2003.

PCT Application No. PCT/US03/41421, International Search Report mailed Jun. 3, 2004.

U.S. Appl. No. 10/158,036, Office Action mailed Oct. 30, 2007.
U.S. Appl. No. 10/158,036, Final Office Action mailed Mar. 1, 2007.
U.S. Appl. No. 10/158,036, Office Action mailed Oct. 17, 2006.
U.S. Appl. No. 10/158,036, Final Office Action mailed Apr. 28, 2006.
U.S. Appl. No. 10/158,036, Office Action mailed Dec. 6, 2005.
U.S. Appl. No. 10/459,013, Office Action mailed Oct. 27, 2005.
U.S. Appl. No. 10/459,013, Final Office Action mailed Mar. 24, 2005.
U.S. Appl. No. 10/459,013, Office Action mailed Sep. 3, 2004.
U.S. Appl. No. 10/746,099, Office Action mailed May 18, 2011.
U.S. Appl. No. 10/746,099, Final Office Action mailed Dec. 10, 2010.
U.S. Appl. No. 10/746,099, Office Action mailed Aug. 2, 2010.
U.S. Appl. No. 10/746,099, Final Office Action mailed Jan. 12, 2010.
U.S. Appl. No. 10/746,099, Office Action mailed Jul. 31, 2009.
U.S. Appl. No. 10/746,099, Final Office Action mailed Nov. 28, 2008.
U.S. Appl. No. 10/746,099, Office Action mailed May 5, 2008.
U.S. Appl. No. 10/746,099, Final Office Action mailed Oct. 17, 2007.
U.S. Appl. No. 10/746,099, Office Action mailed May 4, 2007.
PCT Application No. PCT/US01/25934, International Search Report mailed Mar. 19, 2002.

* cited by examiner

APPARATUS AND METHODS FOR THE SECURE TRANSFER OF ELECTRONIC DATA

RELATED APPLICATIONS

This application claims the benefit of a provisional application entitled "Systems and Methods for Secure Data Transfer," filed Aug. 18, 2000 and assigned Ser. No. 60/226,082. The contents of the above application is relied upon and expressly incorporated herein by reference.

FIELD OF THE INVENTION

The present invention relates generally to apparatus and methods for providing the secure transfer of data. More particularly, this invention relates to apparatus and methods for securely transferring information over an electronic network where the identities of the participants can be verified by each of the participants in the transaction.

BACKGROUND OF THE INVENTION

The use of electronic networks to convey information among networked users has undergone an enormous amount of growth in recent years. The ability to transfer data using computer applications, such as, for example, electronic mail ("e-mail") and file transfer protocol ("FTP") programs, has become increasingly important in personal, and especially, business communications. Electronic communication services have become invaluable to individual and business concerns.

E-mail is a well-known means of communication for individuals and businesses with access to computers and Internet connections. When a user establishes an account with an e-mail service provider, e.g., America Online™ or Hotmail™, the user is assigned a unique e-mail address, e.g., someone@inter.net. Another individual can send a message to the user by entering the user's e-mail address along with the message and sending it via the Internet. E-mail can provide almost instant message delivery among individuals and businesses over vast distances for very little or no cost.

Despite the advantages of e-mail, there are drawbacks. E-mail messages are insecure, and can be intercepted en route by unknown third parties. Individuals and businesses who communicate electronically need to know that their messages are private, and that they can rely on the address to correctly identify the sender and/or recipient.

FTP allows a user to transfer files between two computers, generally connected via a network. If a system has FTP and is connected to a network, a user can access files available on connected computer systems. FTP allows for the easy transfer of large numbers of files, for instant access to files, and file sharing by many individuals over vast distances.

Despite the advantages of FTP, there are drawbacks. It may be difficult to keep files to be transferred secure and to control the flow of the electronic files. Individuals and businesses who use FTP for file sharing need to know that their files are kept private and that they can correctly identify the requestor and source of the file.

In addition to e-mail and FTP programs, other types of data transfer are employed in business communications. For example, buying and selling goods online, electronic finds transfer, online advertising, and accessing business information resources, is known as electronic commerce (E-commerce). E-commerce can improve the efficiency of current business processes and provide opportunities to widen existing customer bases. As the number of Internet users continues to expand, E-commerce has the potential to be the source of all extraordinary amount of revenue growth. In order to realize this potential, a variety of communication services and features will be required for E-commerce, which traditionally have been available in physical communication channels.

The United States Postal Service (USPS), an independent establishment of the executive branch of the U.S. government, provides many E-commerce features through a variety of document and package delivery services. The USPS is widely recognized as a secure and reliable means for sending and receiving packages and mail used for both personal and business transactions. Packages and mail sent via the USPS are time-stamped with an official postmark, which provides the recipient with proof of the time the item was sent. Additionally, once a package or mail item is placed with the USPS, the item is no longer in the sender's control, and thus cannot be recalled. Furthermore, packages and mail sent through the USPS are protected from third-party tampering by Federal laws.

In contrast, electronic communication services and E-commerce services currently do not provide these features. Additional security enhancements, such as authenticating the identities of the parties involved in a transaction and/or providing assurance to the recipient that a received message has not been altered, may also be required for these services to reach their full potential.

To ensure the vitality and growth of electronic communication services and E-commerce services, individuals and businesses need a secure way to communicate and conduct business electronically. Without trustworthy channels of communication, many potential participants in electronic communication and E-commerce may be unwilling to send sensitive information electronically.

In light of the foregoing, it is desirable to provide systems and methods for electronic communication services and E-commerce services providing a level of security which meets or exceeds the current level offered by the existing physical package and mail delivery services. In addition, it is also desirable to provide a system for communicating electronically that provides a secure and reliable way to conduct transactions electronically.

SUMMARY OF THE INVENTION

In accordance with the purpose of the present invention, as embodied and broadly described herein, the invention provides systems and methods for securely transferring information over an electronic network wherein the identities of the participants can be mutually verifiable.

An embodiment of the invention provides a method for processing a secure electronic transaction over a network from a sender to a receiver, which includes the process of generating a first unique representation of information included in the transaction, encrypting the information with a first encryption layer, and forming an encryption packet which includes the first encryption layer. The encryption packet is then transmitted over a network and then received the by a receiver. The authenticity of the encryption packet is verified and a receipt is generated using the information included in the encryption packet. The receipt is then transmitted to an electronic postmark server which verifies the authenticity of the receipt. A postmarked receipt is then created by the electronic postmark server and a copy is sent to the sender and/or the receiver.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made to the present embodiments consistent with the invention, examples of which are illustrated in the accompanying drawings. Wherever possible, the same reference numbers will be used throughout the drawings to refer to the same or like parts.

The described system and methods relate to a secure electronic transaction service that allows a user to send information over a network from sender to receiver in such a way that both parties have assurance that the information transmitted cannot be compromised during transit and that the identities of each participant in the transaction are mutually known.

DETAILED DESCRIPTION

Figure 1:
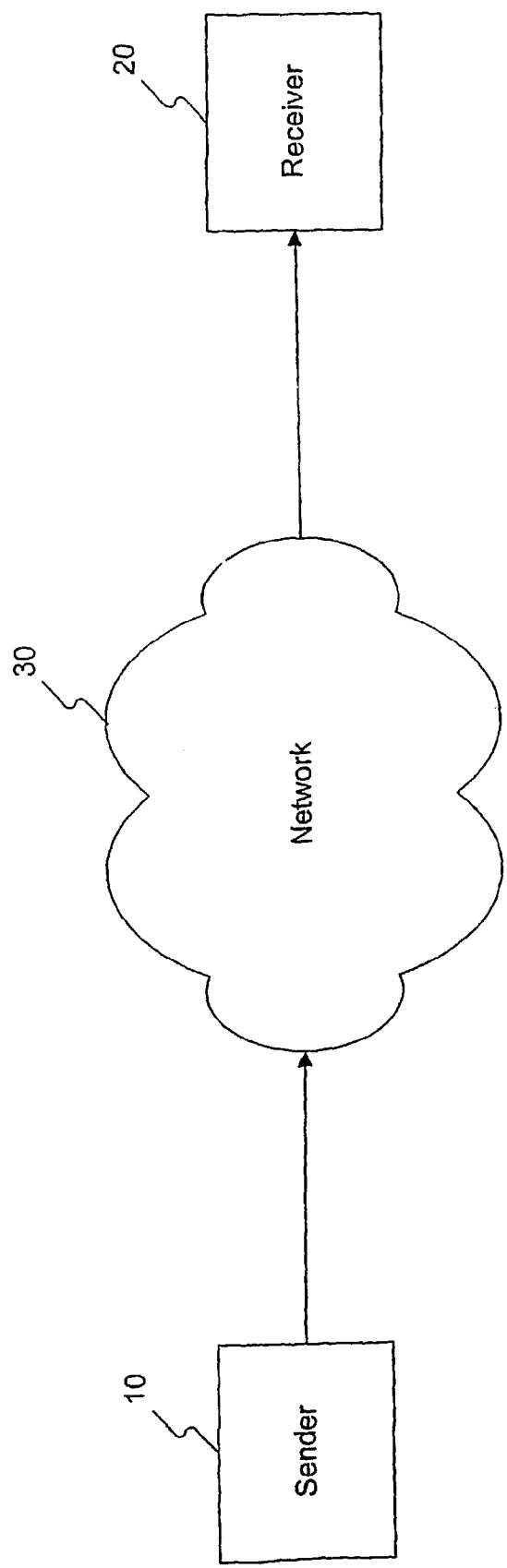
FIG. 1 is a diagram illustrating a basic model for sending a message.

FIG. 1 is a diagram illustrating a basic model for sending a message. A sender 10 sends a message (not shown) through a network 30 to a receiver 20.

Figure 2:
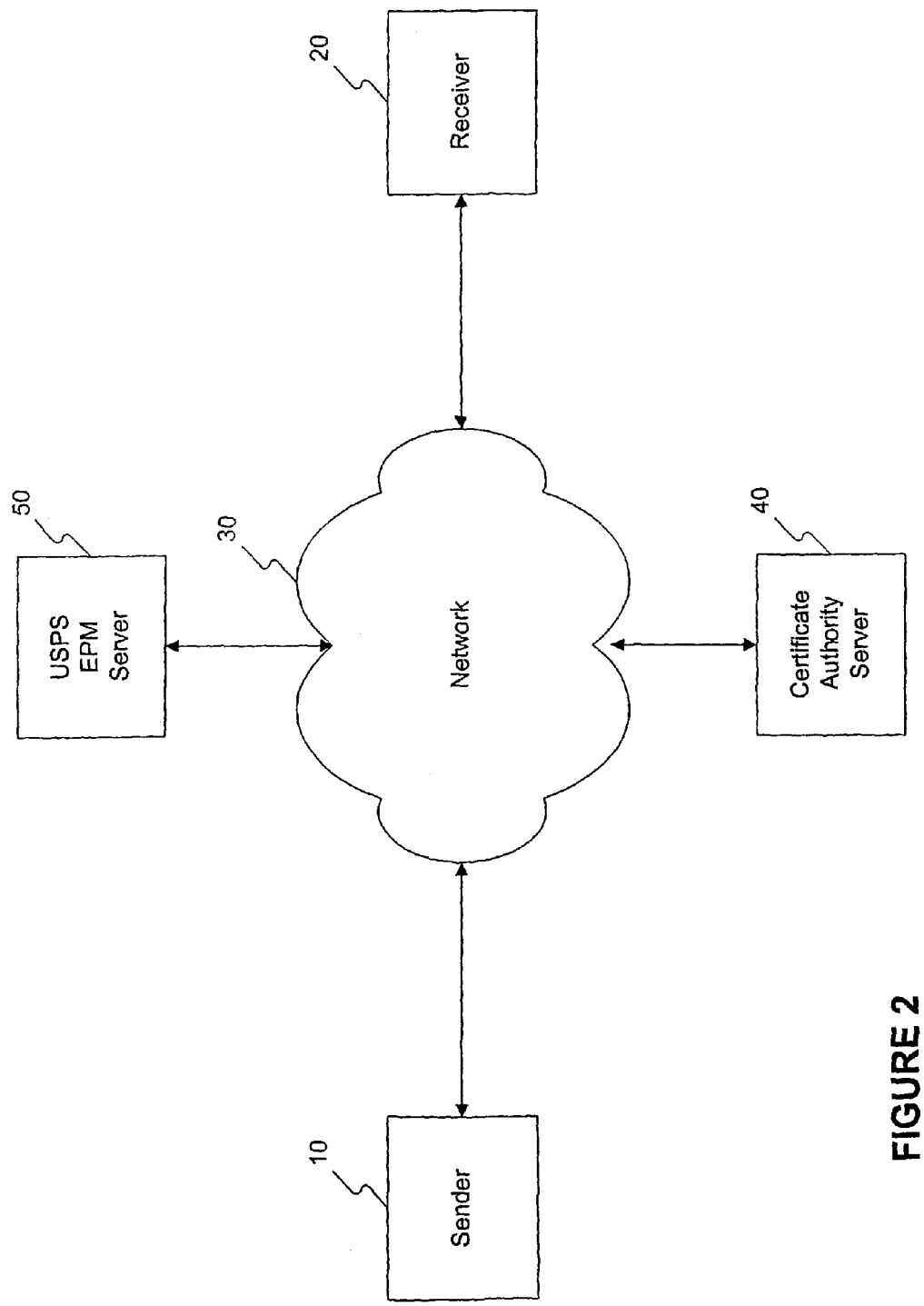
FIG. 2 is a diagram illustrating a system consistent with an embodiment of the invention.

FIG. 2 is a diagram illustrating a secure electronic transaction service consistent with the invention. As shown in FIG. 2, a sender 10 and a receiver 20, each of which can be a workstation, or personal computer, a Personal Digital Assistant (PDA), or any networkable device, communicate over a network 30, which can be TCP/IP based, wireless, or any kind of digital network connection. In one embodiment, a certificate authority (CA) server 40 and an electronic postmark (EPM) server 50 are also part of the communication path. CA servers are systems which are used to verify an individual's identity, and may utilize digital certificates which are known to those skilled in the art. CA servers may be used by companies providing digital identification services, such as, for example, GTE. Another example of CA server could is the system described in U.S. Provisional Patent, filed Aug. 7, 2001, entitled "Apparatus and Methods for Providing a Digital Certificate," which is incorporated by reference in its entirety herein. One example of an EPM system is described in U.S. patent application Ser. No. 09/675,677, filed Sep. 29, 2000, entitled "Systems and Methods for Authenticating an Electronic Message," which is incorporated by reference in its entirety herein.

Digital certificates can be received from the U.S. Postal Service (USPS) through a networked processing system. An Internet Customer Registration System is described in U.S. patent application Ser. No. 09/809,328, entitled "Methods and Systems for Establishing an Electronic Account for a Customer," which is incorporated by reference in its entirety herein. When the user first receives a digital certificate they can choose to download it through a specific computer for storage in a token device such as a floppy, a zip drive, a smart card, or any other type of recordable media.

A digital certificate is a data structure used to verify the identity of an individual, and typically include a public/private key pair and a certificate number, which is some kind of reference to the certificate used by the CA which issued the certificate. The public key may be universally published, while the private key is typically be kept secure and private. A document is digitally signed by appending to the document a function of the private key in the form of a data string. The digital signature is the function of the private key. When a user receives a digitally signed document, the user uses the public key to decrypt the digital signature. After decrypting the digital signature, the user will be presented with a certificate number and the name of a CA verifying the signature. At this point the user can ask the CA to verify the certificate number. The CA will return the name associated with the certificate number and the name of the owner of that certificate. The digital signature could be added to the file by appending it to the file, placing it somewhere within the file, or other know processes in the art described in Chapter 11 of the Handbook of Applied Cryptography by Alfred J. Menezes. Just the certificate number and CA information could be attached to a document. After receiving the certificate number, the user receiving the document could perform a check with the CA on the identity of the owner of the certificate and the validity of the certificate.

Figure 3:
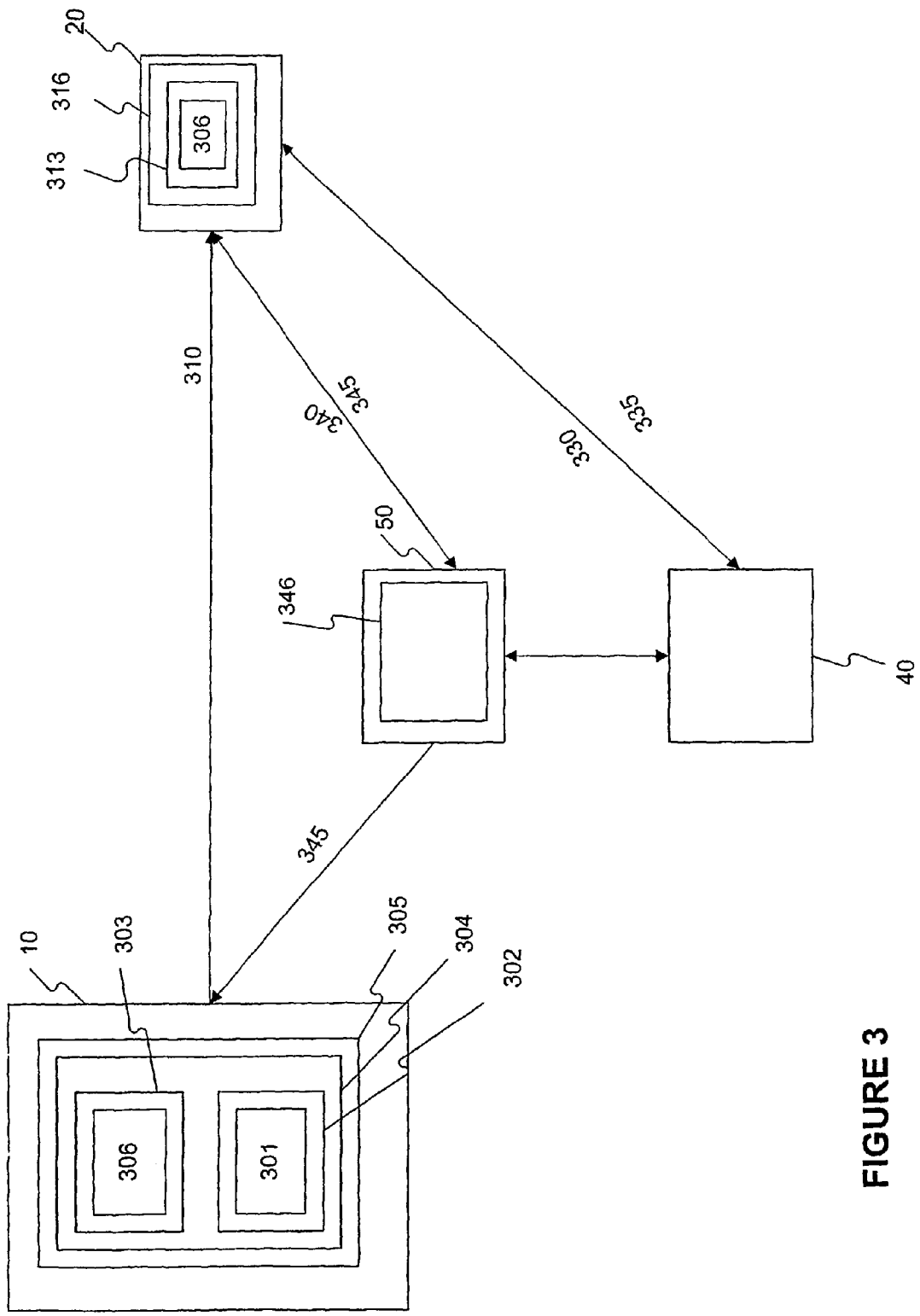
FIG. 3 is a diagram illustrating one embodiment of the data flow for the system depicted in FIG. 2.

FIG. 3 is a diagram illustrating one embodiment of the data flow for the secure electronic transaction service depicted in FIG. 2. As shown in FIG. 3, information 301 represented in electronic form (which may be ASCII text, ASCII coded binary data, or raw binary data) is to be sent from sender 10 to receiver 20. The information 301 is processed to create unique representation 306 of the information. This processing can take the form of creating a hash of the information. The hash may be formed by methods known to those skilled in the art, for example, the Secure Hash Standard FIPS 180-1. In one optional implementation, unique representation 306 is digitally signed with the sender's digital signature 303. Industry accepted standard algorithms may be used to generate the digital signature. By way of example only, the Digital Signature Algorithm (DSA) with the option of Elliptic Curve DSA may be used.

The information itself is then encrypted in a first encryption layer 302. The encrypted information 302 and the unique representation 306 are then combined together. At this stage, a second encryption layer could optionally be added. This second encryption layer would be used if the sender desired an extended level of security at the expense of additional computations. Any encryption methods may be used, such as, for example, triple des, which is an industry-accepted standard.

After the initial encryption, in this implementation, first encryption layer 302 and the digitally signed unique representation 306 are then together digitally signed. This second signature process may use either the same sender's digital signature 303 or a different signature 304 to create an encryption packet 305. If the signature 303 or 304 originates from the USPS, encryption packet 305 could be afforded Federal legal protection currently afforded to the physical mail process conducted by the USPS.

Next, sender 10 transmits encryption packet 305 to receiver 20 (310). Receiver 20 sends digital signature 303 or 304 to CA server 40 for verification of the validity of the sender's digital signature 303 or 304 (330). A verification authority, like CA server 40, verifies the legitimacy of the identity of the digital signature user and validity of their digital certificate. The verification authority then sends the receiver an indication of the status of user of the digital signature. If verified, CA server 40 then sends back verification that user of digital signature 303 or 304 is valid and has not been revoked (335). If not verified, CA server 40 sends back a message indicating the user of digital signature 303 or 304 is not valid.

After verification of digital signature is received, receiver 20 digitally signs the unique representation 306 with the receiver's digital signature 313 creating a receipt, 316. Receiver 20 transmits receipt 316 to EPM server 50. After receiving receipt 316, EPM server 50 sends digital signature 313 to CA server 40 for verification of the validity of the user of digital signature 313. In another embodiment, EPM server may also verify the sender's digital signature 303. Once receiver's digital signature 313 is verified, EPM server 50 creates a postmarked receipt 346 of the transaction. Postmarked receipt 346 comprises a unique representation of receipt 316 and contains, among other information, a date and time stamp which uniquely identifies the transaction, all of which are digitally signed. EPM server 50 then sends a copy of postmarked receipt 346 to both sender 10 and receiver 20. Once postmarked receipt 346 is received by receiver 20, first encryption layer 302 can be removed and information 301 can be viewed by receiver 20, with assurance that the transaction has been documented and is secure. The decryption of first encryption layer 302 can take place either before or after receiving verification from CA server 40.

Figure 4:
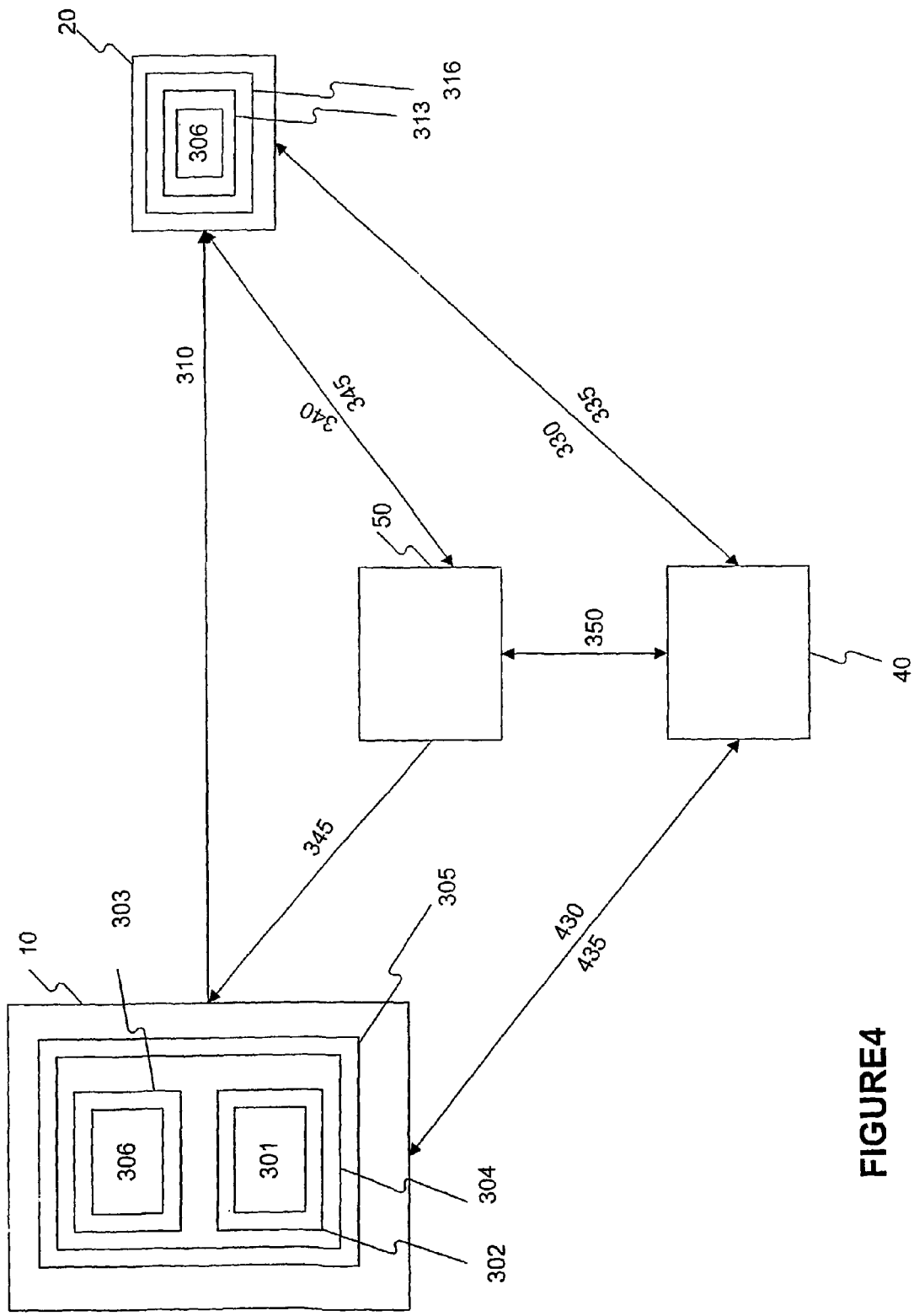
FIG. 4 is a diagram illustrating another embodiment of the data flow for system depicted in FIG. 2.

FIG. 4 is a diagram illustrating another embodiment of the service depicted in FIG. 2, illustrating alternative data flows. FIG. 4 is similar to FIG. 3, but includes the additional capability of sender 10 initially verifying the digital signature 313 for receiver 20 prior to transmissions. Sender 10, prior to transmitting encrypted information packet 305, sends digital signature 313 for receiver 20 to the CA server 40 for verification of the validity of the user of digital signature 313. If verified, CA server 40 then sends back verification that the user of digital signature 313 is valid and has not been revoked (435). If not verified, CA server 40 sends back a message indicating that digital signature 313 is not valid. This process allows sender to initiate the verification of the identity of receiver in a transaction, thus improving the efficiency of the transaction.

Figure 5:
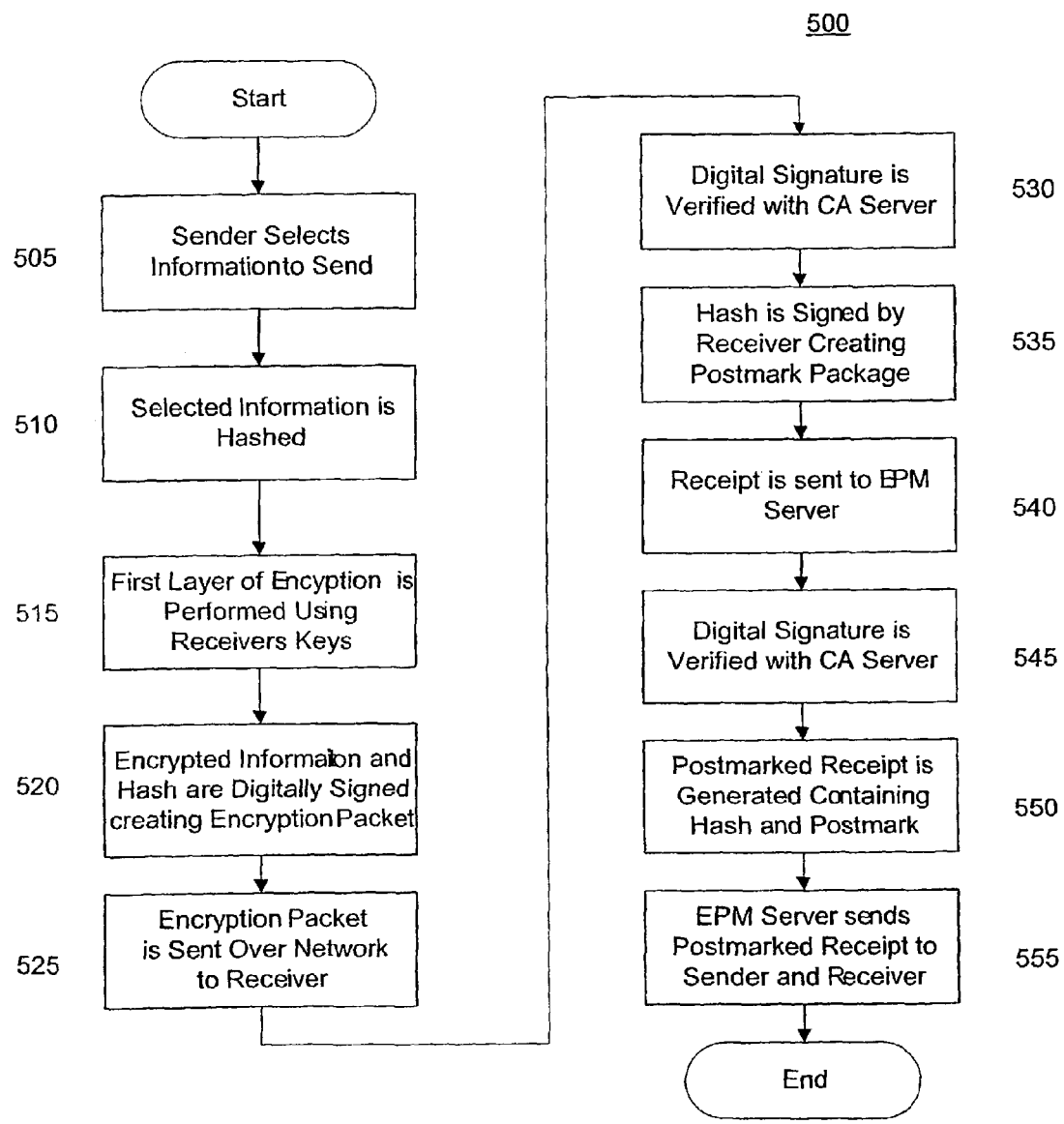
FIG. 5 is a diagram illustrating one embodiment of the sending function of the system depicted in FIGS. 3 and 4.

FIG. 5 is a diagram illustrating one embodiment of the sending function of the services in FIGS. 3 and 4. As shown in FIG. 5, a sender initiates the sending function by selecting information that is to be sent (stage 505). Information may be selected in the form of electronic files by the sender using a graphical user interface, such as Windows Explorer. The user then selects a destination for the information. The destination can be selected from send/receive relationships to help avoid mistakenly sending the information to the wrong destination. The sender's selection of files may be accomplished using stand-alone software or may utilize standard e-mail programs, for example, Outlook Express, or other file transfer programs such as WinFTP.

A hash of the information is then taken (stage 510). A first encryption layer is then applied to the information (stage 515) using a public key of the receiver. Next, the encrypted information and hash are signed creating an encryption packet (stage 520). The encryption package is then sent over the network to a receiver (stage 525).

Once at the receiver, the sender's digital signature is verified with the CA server to confirm the digital signature is valid (stage 530). If valid, the receiver digitally signs the hash creating a receipt (stage 535). The receiver the sends the receipt to the EPM server for electronic postmarking (stage 540). Once at the EPM server, the receiver's digital signature is verified with the CA server to confirm the digital signature is valid (stage 545). The EPM server then generates a postmarked receipt containing the hash of the receipt and other postmark data which is signed by the EPM server (stage 550) The EPM server then sends the postmarked receipt to both the sender and the receiver (stage 555).

Figure 6:
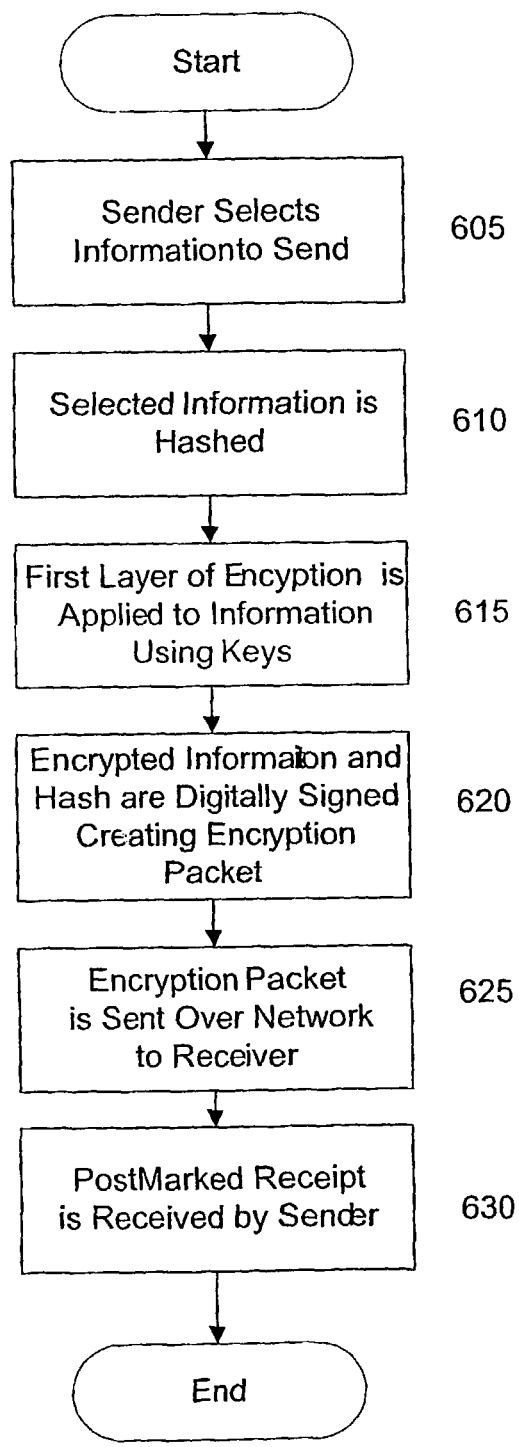
FIG. 6 is a diagram illustrating one embodiment of the senders actions of the system depicted in FIGS. 3 and 4.

FIG. 6 is a diagram illustrating another embodiment of the senders action, as depicted in FIGS. 3 and 4. As shown in FIG. 6, a sender initiates the sending function by selecting information that is to be sent (stage 605). A hash of the information is then taken (stage 610). A first encryption layer is then applied to the information (stage 615). This encryption layer uses keys, such as the sender's private key and the recipient's public key, to encrypt the message using standard encryption techniques. Next, the encrypted information and hash are signed creating an encryption packet (stage 620). The encryption packet is then sent over the network to a receiver (stage 625). After the receiver receives the encrypted information package, the sender receives a postmarked receipt for the transaction from the EPM server (stage 630). With the postmarked receipt from the EPM server, the sender has confirmation that the transaction was successfully completed.

Figure 7:
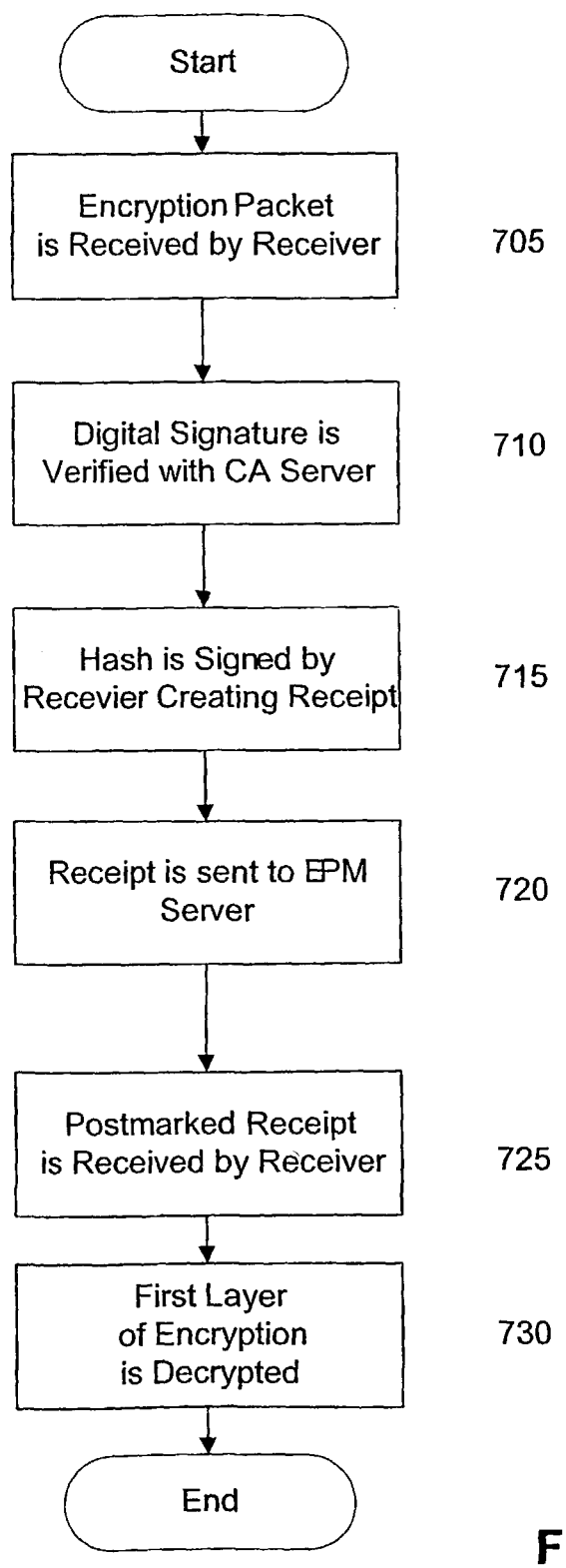
FIG. 7 is a diagram illustrating one embodiment of the receivers actions of the system depicted in FIGS. 3 and 4.

FIG. 7 is a diagram illustrating one embodiment of the receiver's action of the system depicted in FIGS. 3 and 4. An encryption packet is received by a receiver (stage 705). The encryption packet contains encrypted information and a hash of this encrypted information all of which have been signed by the sender using the sender's digital signature (private key). Next the sender's digital signature is verified with the CA server to confirm the digital signature is valid (stage 710). If valid, the receiver digitally signs the hash, creating a receipt (stage 715). The receiver then sends the receipt to the EPM server for electronic postmarking (stage 720). A postmarked receipt is received from the EPM server (stage 725). With the postmarked receipt from the EPM server, the receiver may then remove the first encryption layer (stage 730) with assurance that the transaction was secure and the identities of the parties verified. At this point the receiver can then view the information contained in the package. It is not functionally necessary for the receiver to wait for the receipt before removing the first encryption layer. This step can take place immediately after the sending a receipt to the EPM server a postmark package.

Figure 8:
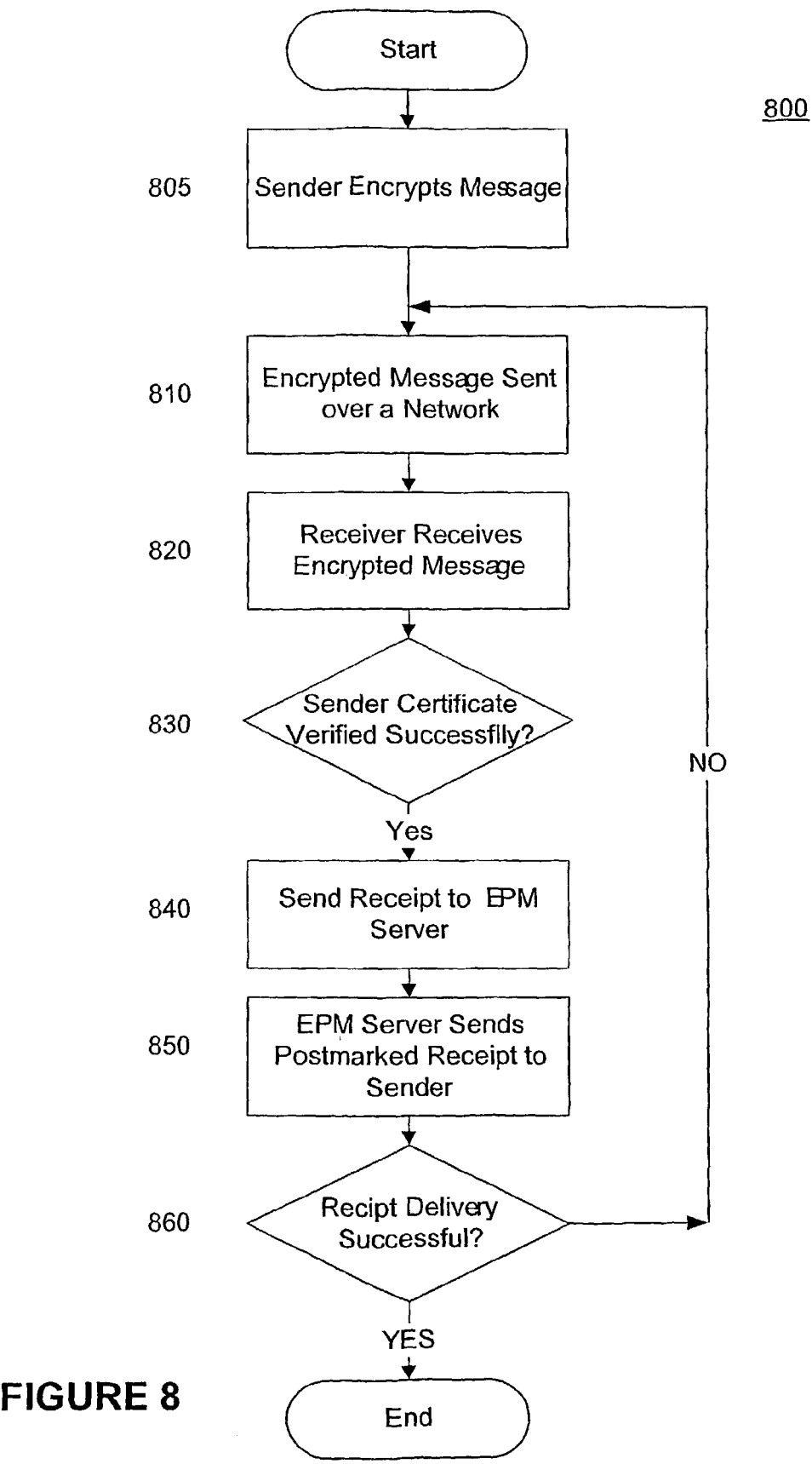
FIG. 8 is a diagram illustrating one embodiment of the receipt generation of the system depicted in FIGS. 3 and 4.

FIG. 8 is a diagram illustrating a method using a postmarked receipt in the service depicted in FIGS. 3 and 4. As shown in FIG. 8, the sender encrypts a message (stage 805). The encrypted message is sent over a network to a receiver (stage 810). The receiver receives the encrypted message (stage 820). Once the receiver has received the encrypted message, the receiver sends a request to the CA server to verify the identity of the sender (stage 830). If the CA server cannot verify the identity of the sender, no receipt will be generated. Once the CA server verifies the identity of the sender, a receipt is generated and sent to the EPM server (stage 840). The EPM server then sends the postmarked receipt to the sender (stage 850). At this time, a check is performed to determine if postmarked receipt delivery is successful (stage 860). If receipt delivery is not successful then the encrypted message will be resent. If it is successful then the process is complete.

Figure 9:
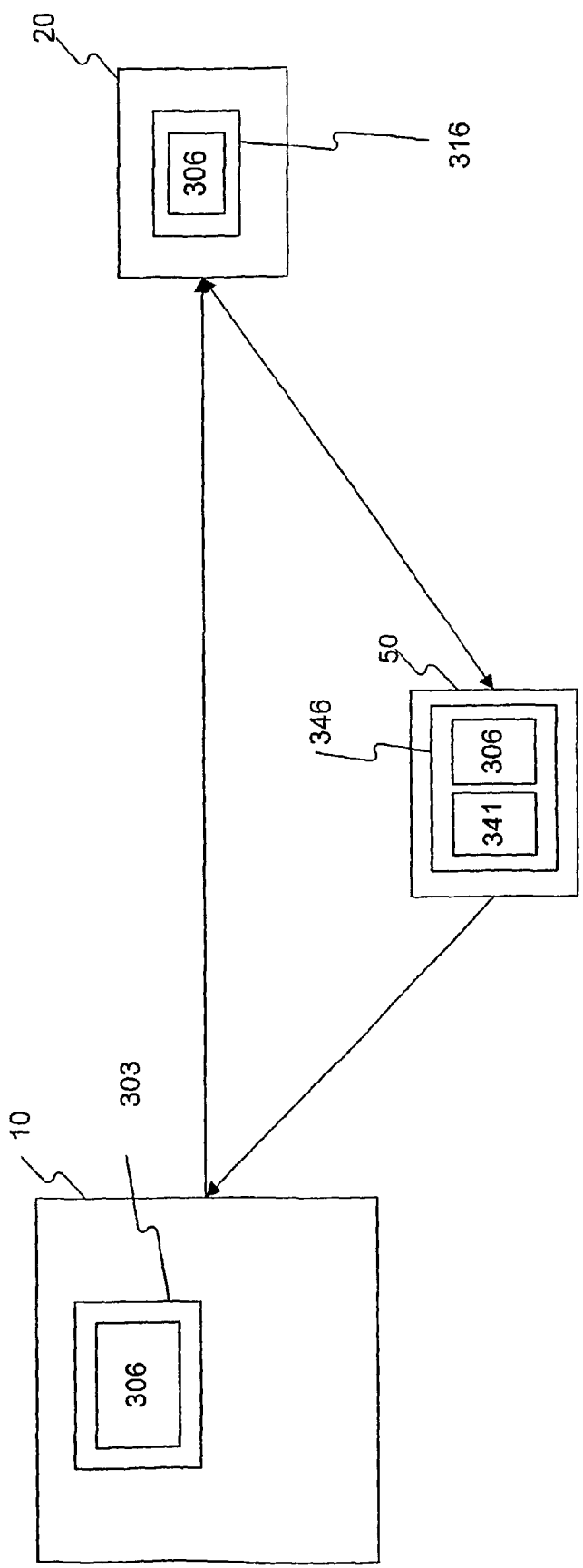
FIG. 9 is a diagram illustrating the receipt generation process.

FIG. 9 is a diagram illustrating a receipt generation process. Sender 10 sends a hash 306 to the receiver 20. Receiver 20 digitally signs hash 306 creating a receipt 316. Receiver 20 sends receipt 316 to the EPM server 50, asking for a postmarked receipt of the transaction. The EPM server 50 creates a postmarked receipt 316 and sends a copy of postmarked receipt 346 to both sender 10 and to receiver 20. The postmarked receipt 341 contains a time and date stamping of the receipt, that will provide a unique specific representation for a singular transaction.

Figure 10:
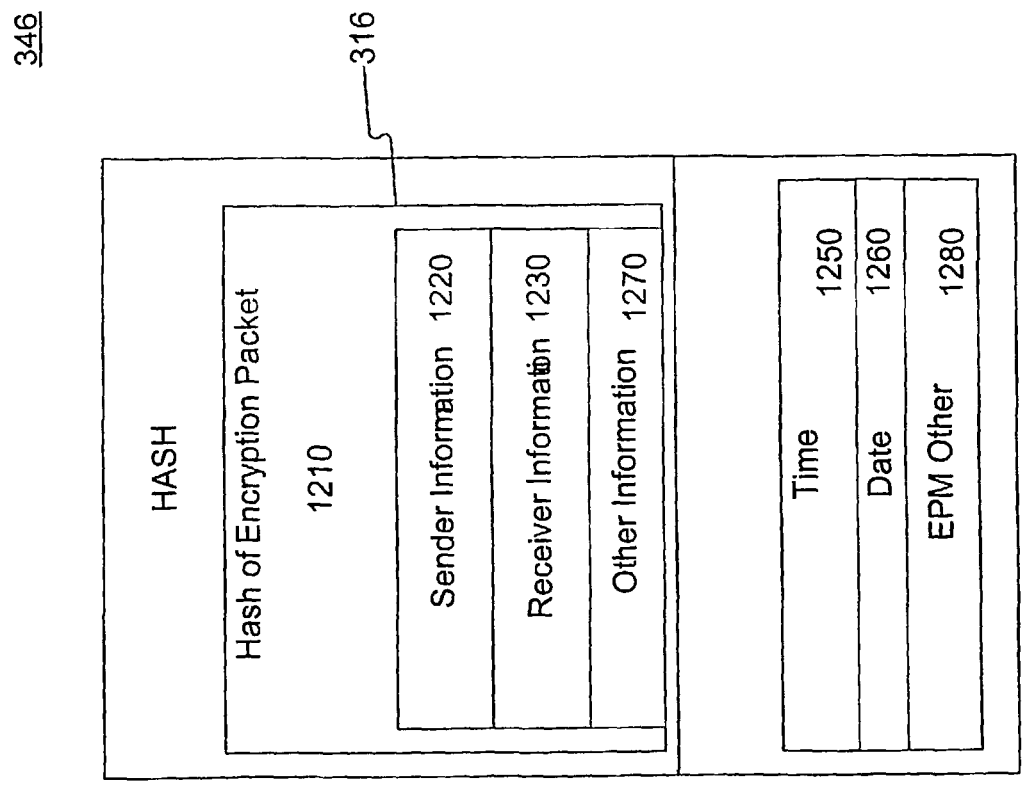
FIG. 10 is a diagram illustrating a format of a receipt.

FIG. 10 is a diagram illustrating an embodiment of a format for the postmarked receipt 346. Postmarked receipt 346 includes a hash of the receipt, the time 1250, the date 1260, and other EPM information 1280. The receipt can include the hash of the encryption packet and may also optionally include sender information 1220, receiver information 1230 and/or other information 1270. The postmarked receipt allows a sender to legally verify and confirm the electronic transaction for an individual exchange. Postmarked receipt generation gives both verification that the transaction was completed successfully and an audit capability to ascertain whether or not the receiver did in fact receive the transaction in an unaltered state.

Figure 11:
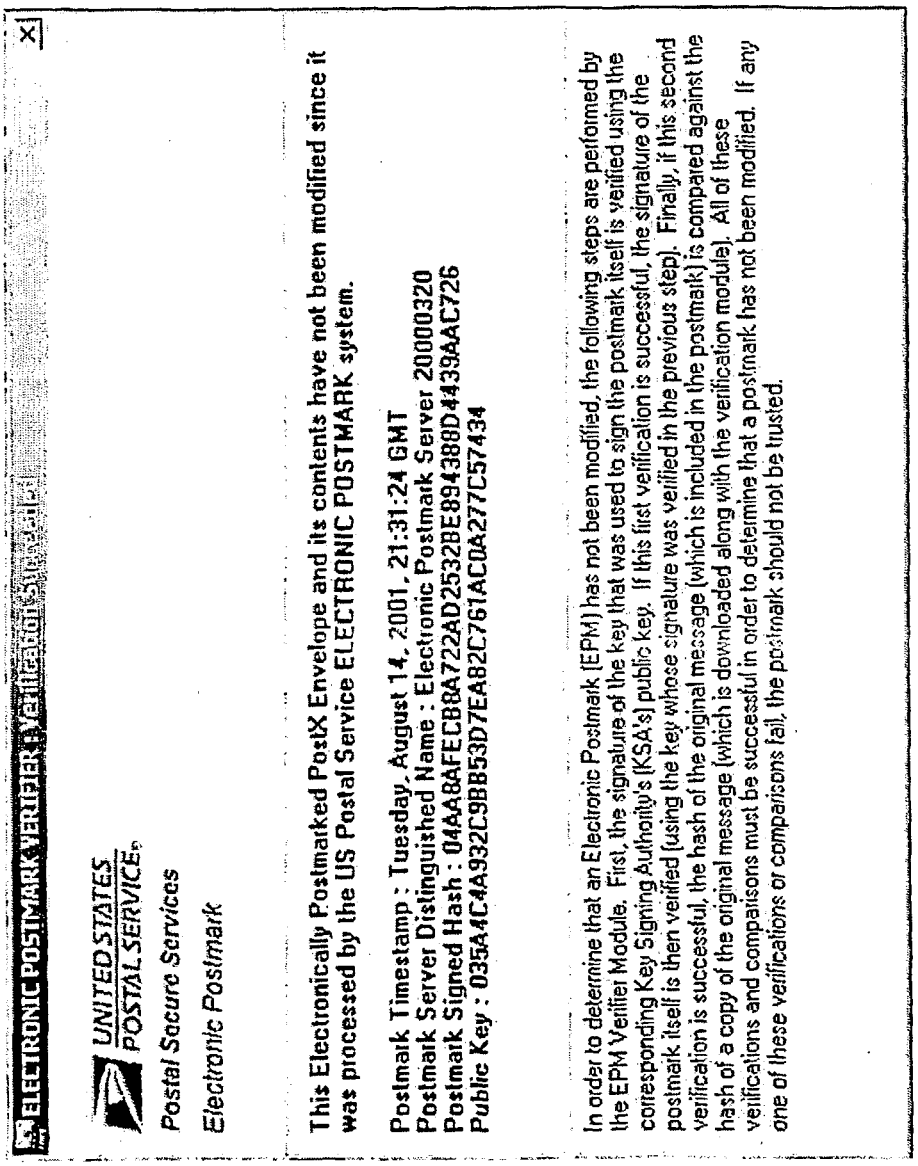
FIG. 11 is a diagram illustrating a format of an electronic postmark.

FIG. 11 is a diagram illustrating printout of a sample electronic postmark. The printout shows a postmark timestamp, with the date and the time. It includes a postmark server name, indicating which postmark server issued the postmark, and a postmark signed hash of the original message. Further it includes a pubic key, signing the postmark. Included in the postmark is information about how to verify the authenticity of the postmark.

Figure 12:
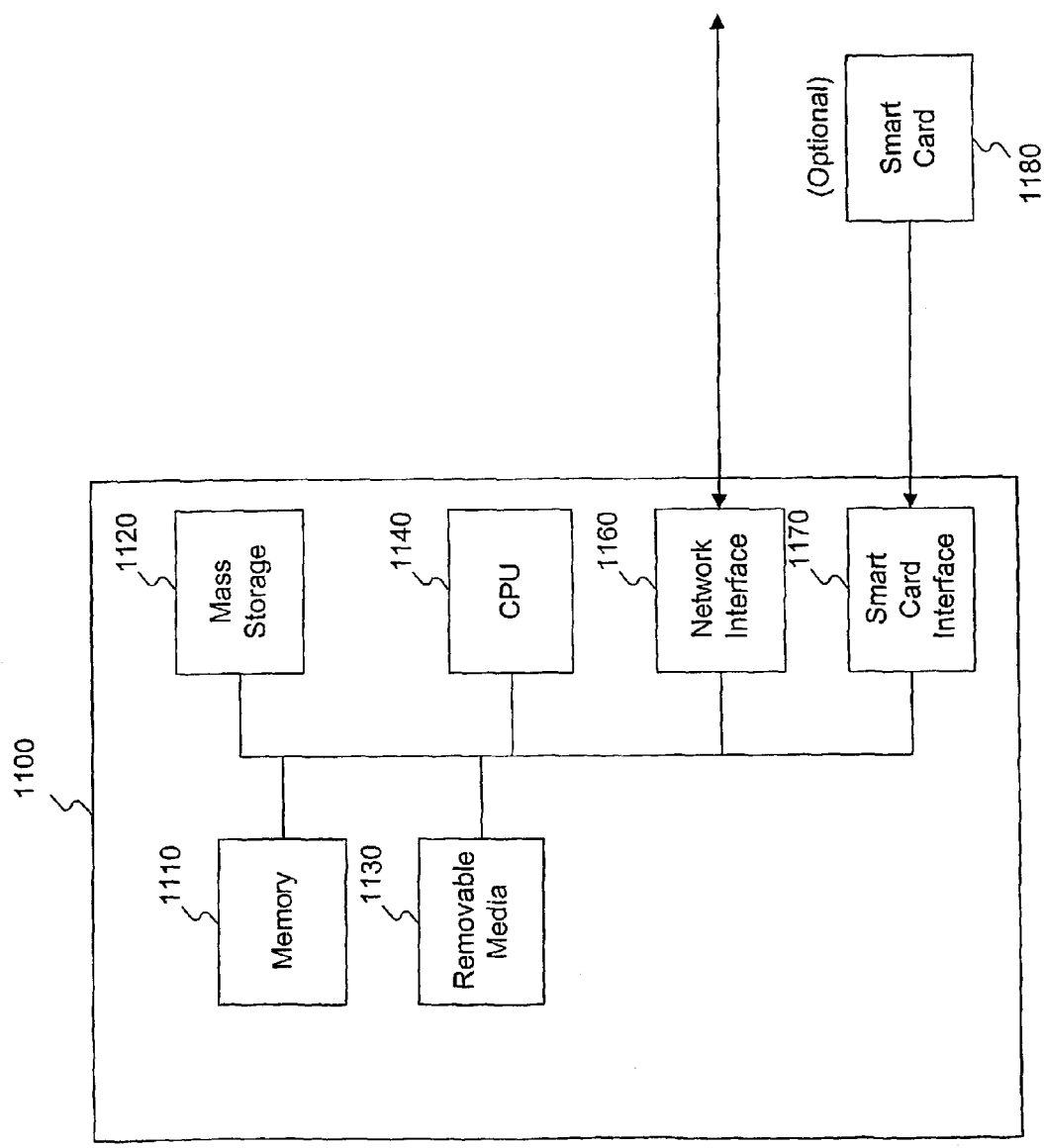
FIG. 12 is a diagram illustrating a sender/receiver computer.

FIG. 12 is a diagram illustrating a client system 1100, which can be a workstation, personal computer or other processing apparatus in which sender 10 or receiver 20 may be operated. For example, an embodiment of the client system could be an Intel-based machine running an operating system, such as, for example, Windows NT or Windows 2000. Client system 1100 comprises a memory 1110 in which an operating system, a user interface 1150, and verification software may reside. Much of the software necessary to run the client system can also reside in mass storage 1120, which may be a hard drive or other form of mass storage known to those in the art. Stored instructions are executed on a CPU 1140, which is connected to the memory 1110 and mass storage 1120 over a central data bus (not shown). A removable media 1130 may also be connected to the bus, this unit can be used to store digital certificates. The removal media could be a zip drive, optical drive, floppy disk, smart card. This system also includes a network interface 1160, which can communicate to other client systems over a network. In one embodiment, a dedicated smart card interface 1170, such as a Trithium smart card reader, allows the client to provide a digital signature via a smart card 1180. The dedicated smart card interface can be functionally coupled to the client system using an industry standard interface, such as, a USB, IEEE 1394 parallel, or RS-232 serial interface.

Figure 13:
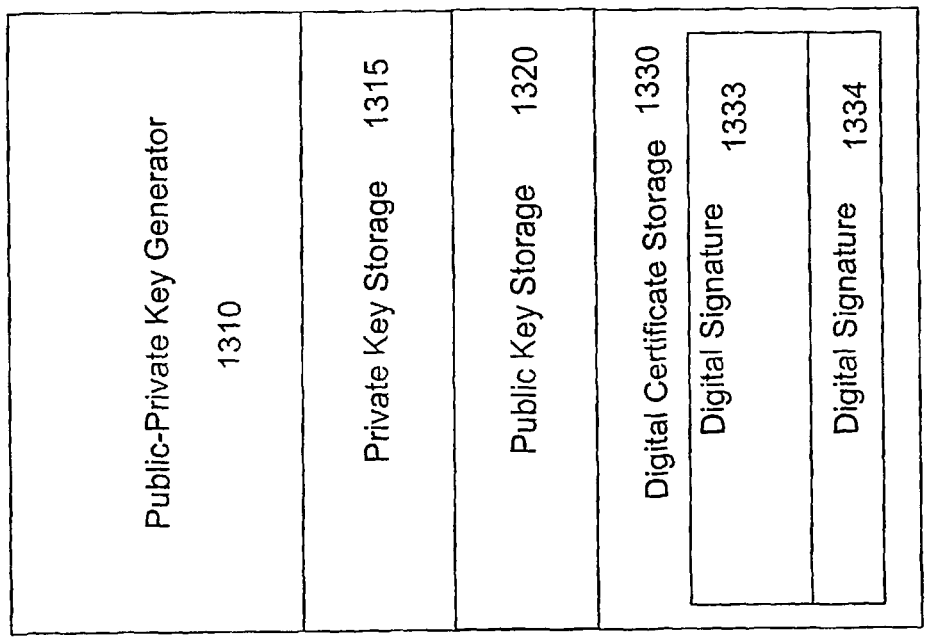
FIG. 13 is a diagram illustrating a smart card.

FIG. 13 is a diagram illustrating a smart card 1300. Smart card 1300 can be used to hold and protect a user's credentials, such as digital keys. Smart card 1300 includes a private-public key pair generator 1310. Smart card 1300 offers a protected private key storage 1315 and public key storage 1320. It may also have storage 1330 for at least two digital certificates containing a user's digital signatures 1333 and 1334. Digital signature 1333 can be used for encryption purposes and digital signature 1334 can be used for signing and authentication of identity.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for processing a secure electronic transaction sent over a network from a sender computing device to a receiver computing device, the method comprising:
   receiving an encryption packet at the receiver computing device, the encryption packet signed with a digital signature of the sender computing device and including:
      a first encryption layer of information selected by a user of the sender computing device, and
      a unique representation of the selected information, the unique representation signed with the digital signature of the sender computing device;
   sending a verification request from the receiver computing device to a validation authority, the verification request including the digital signature of the sender computing device and requesting verification of an authenticity of the digital signature of the sender computing device;
   receiving a response from the validation authority, the response verifying the authenticity of the digital signature of the sender computing device;
   generating a receipt, wherein generating the receipt includes signing the unique representation of the selected information of the encryption packet with a digital signature of the receiver computing device;
   sending the receipt containing the signed unique representation of the selected information to an electronic postmark server without sending the first encryption layer and the selected information, the receiver computing device sending the receipt after the receiver computing device received the response verifying the authenticity of the digital signature of the sender computing device; and
   receiving from the electronic postmark server a postmarked receipt, the postmarked receipt having been generated from the receipt sent by the receiver computing device and not including the first encryption layer and the selected information.

2. The method of claim 1, wherein forming the encryption packet further includes encrypting the encryption packet in a second encryption layer.

3. The method of claim 1, further comprising decrypting the first encryption layer in the encryption packet.

4. A system for processing a secure electronic transaction sent over a network from a sender computing device to a receiver computing device, the system comprising:
   a sender computing device that receives transaction information selected by a user of the sender computing device and executes instructions stored in memory, wherein execution of the instructions by a processor of the sender computing device:

generates a unique representation of the selected information, signs the unique representation of the selected information with a digital signature of the sender computing device, encrypts the selected information in a first encryption layer, and forms an encryption packet, wherein forming the encryption packet includes combining the first encryption layer and the unique representation of the selected information, encrypting the combined first encryption layer and unique representation of the selected information, and signing the encryption packet with the digital signature of the sender computing device;

a receiver computing device that receives the encryption packet over the network from the sender computing device and executed instructions stored in memory, wherein execution of the instructions by a processor of the receiver computing device:

sends a verification request to a validation authority, the validation request requesting verification of an authenticity of the digital signature of the sender computing device, acknowledges receipt of a response from the validation authority, the response verifying the authenticity of the digital signature of the sender computing device, and generates a receipt, the receipt including the unique representation of the selected information without the first encryption layer and the selected information itself, wherein generating the receipt includes signing the unique representation of the selected information of the encryption packet with a digital signature of the receiver computing device; and an electronic postmark server that receives the receipt from the receiver computing device and executes instructions stored in memory, wherein execution of the instructions by a processor of the electronic postmark server:

verifies an authenticity of the receipt based on the digital signature of the receiver computing device, generates a postmarked receipt not containing the first encryption layer and the selected information, wherein generating the postmarked receipt includes:

generating a unique representation of the authenticated receipt received from the receiver computing device, appending a temporal stamp to the unique representation of the authenticated receipt, and signing the unique representation of the authenticated receipt with a digital signature of the electronic postmark server, and sends a copy of the postmarked receipt to at least one of the sender computing device and the receiver computing device.

5. The system of claim 4, wherein forming the encryption packet further includes encrypting the encryption packet in a second encryption layer.

6. The system of claim 4, wherein verifying the authenticity of the receipt based on the digital signature of the receiver sending device includes sending the digital signature of the receiver computing device to a validation authority.

7. The system of claim 4, wherein the receiver computing device receives the postmarked receipt at a network interface and decrypts the first encryption layer in the encryption packet.

8. The system of claim 4, wherein the sender computing device receives the postmarked receipt at a network interface.

9. The method of claim 1, wherein the first encryption layer is encrypted with an encryption key.

10. The method of claim 9, wherein the encryption key is a public key belonging to the receiver computing device.

11. The system of claim 4, wherein encrypting the selected information in the first encryption layer includes encrypting the selected information with an encryption key.

12. The system of claim 11, wherein the encryption key is a public key belonging to the receiver computing device.

13. A method for processing a secure electronic transaction sent over a network from a sender computing device to a receiver computing device, the method comprising:

receiving an electronic communication from the receiver computing device at an electronic postmark server, the electronic communication indicating that an encrypted electronic message containing encrypted information selected by a user of the sender computing device and a unique representation of the selected information had been received by the receiver computing device from the sender computing device, indicating that an identity of the sender had been verified, and containing a copy of the unique representation of the selected information signed by a digital signature of the receiver computing device without containing the encrypted information selected by the sender;

verifying an authenticity of the electronic communication, wherein verifying the authenticity of the electronic communication includes receiving from a verification authority a verification of an authenticity of the digital signature of the receiver computing device;

creating an electronic postmarked receipt from the authenticated electronic communication received from the receiver computing device, the postmarked receipt not containing the encrypted information selected by the sender, wherein creating the electronic postmarked receipt includes:

generating a unique representation of the authenticated electronic communication, appending a temporal stamp to the unique representation of the authenticated electronic communication, and digitally signing the unique representation of the authenticated electronic communication and the temporal stamp; and sending the signed electronic postmarked receipt to the sender computing device.

14. The method of claim 13, further comprising sending the signed electronic postmarked receipt to the receiver computing device.

15. The method of claim 13, wherein the electronic message includes a digital signature of the sender computing device used by the receiver computing device to verify the identity of the sender by way of a validation authority.

16. The method of claim 13, wherein the information selected by the sender in the electronic message had been encrypted utilizing an encryption key of the sender computing device.

17. The method of claim 13, wherein the unique representation of the selected information is a hash of the selected information.

* * * * *